March 22, 1966  J. S. KURTZ ETAL  3,241,523
POULTRY CAGE SUPPORT CONSTRUCTION
Filed April 17, 1964  2 Sheets-Sheet 1

INVENTORS
JOHN S. KURTZ
JEWEL GRAVES
BY
ATTORNEYS

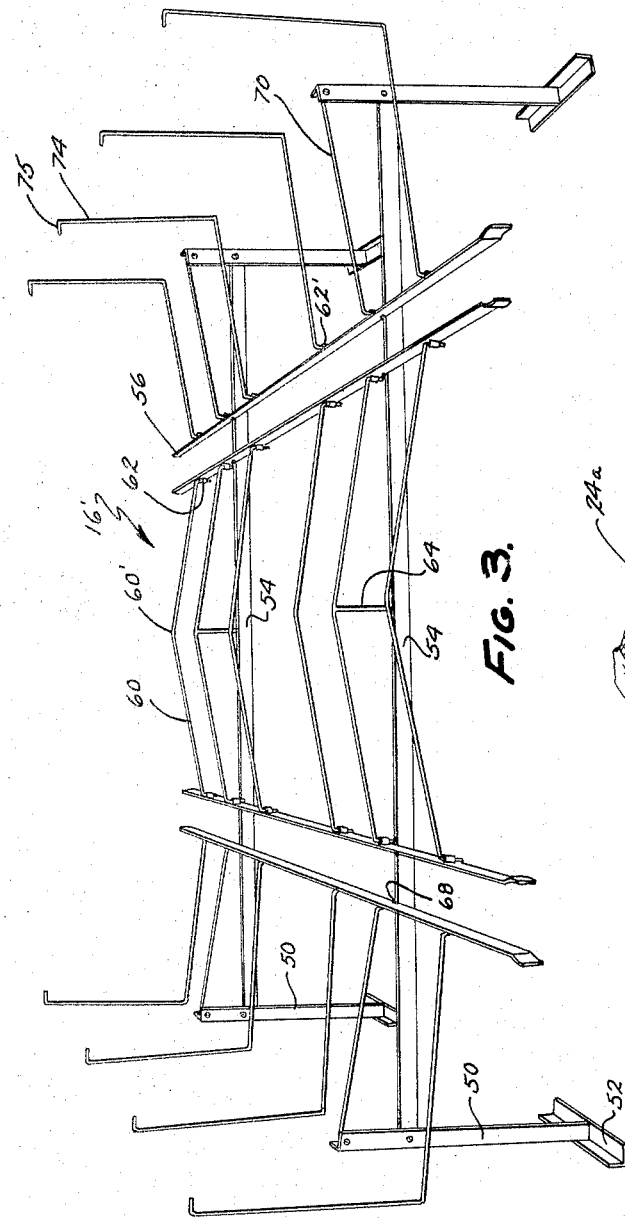
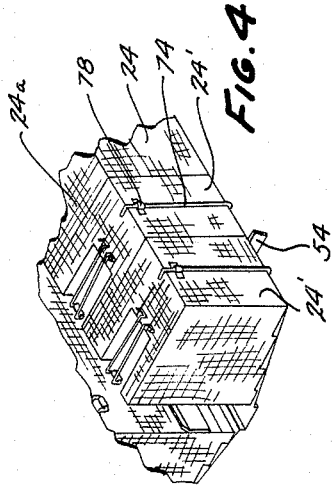

United States Patent Office 3,241,523
Patented Mar. 22, 1966

1

3,241,523
POULTRY CAGE SUPPORT CONSTRUCTION
John S. Kurtz, Ephrata, Pa., and Jewel Graves, Holland, Mich., assignors to Big Dutchman, Inc., a corporation of Michigan
Filed Apr. 17, 1964, Ser. No. 360,723
8 Claims. (Cl. 119—48)

This invention relates to poultry cage apparatus, and more particularly to a support framework and poultry cage assembly.

Raising poultry in cages has proven to be definitely advantageous. To be profitable, the poultry cage arrangement must be largely automated so that the birds are automatically fed and watered, and eggs are automatically removed from the cages to a common collection point. Problems have been experienced however, with egg collection from rows of cages. The eggs tend to gather on the conveyor belt near the central portions of each cage row intermediate the spaced supports of the cages.

Careful examination has shown that this failure of the eggs to move with the moving conveyor belt is caused by a bow or slump in the egg conveyor at its central portion. This in turn is caused by a bow in the cage row to which the conveyor is attached. It was determined that the cage row bowed down in the center because its weight and the weight of the birds caused the skeletal wire mesh cage construction to "give" between the supports.

These difficulties, and others concerning the assembly and installation of cages, made it evident that cage rows have not had a good support system.

It is therefore an object of this invention to provide an excellent poultry cage support assembly, one that also achieves dependable egg conveying characteristics.

It is another object of this invention to provide a poultry cage support assembly effecting complete support along the length of poultry cage, yet with a relatively simple, lightweight skeletal structure, to achieve level positioning of the cages and egg conveyors.

It is another object of this invention to provide a relatively inexpensive support assembly employing cantilever principles for certain cage rows, allowing simple assembly by a farmer after purchasing the assembly, and allowing easy movement of the lightweight framework as is necessary.

It is another object of this invention to provide a cage row support assembly with specific portions that serve the dual purpose of properly locating the egg conveyors and also physically supporting the cage rows in proper relationship to each other and to the conveyors.

These and several other objects of this invention will become apparent upon studying the following specification in conjunction with the drawings in which:

FIG. 3 is an enlarged perspective view of the skeletal support framework for the apparatus in FIG. 1; and FIG. 4 is a fragmentary perspective enlarged view of a portion of the cage rows illustrated in FIG. 1.

Referring now specifically to the drawings, the complete assembly 10 includes two groups 12 and 14 of cage rows. Each group is supported on one of the skeletal framework assemblies 16 illustrated in FIG. 3. In combination with these groups of cage rows is egg transferring and collection apparatus 18 and 20 forming no part of this invention. This may be similar to that illustrated for example in co-pending patent application Serial No. 208,302, filed July 9, 1962, now Patent Number 3,166,175, and entitled Egg Collection and Transveyor System.

2

Figure 1:
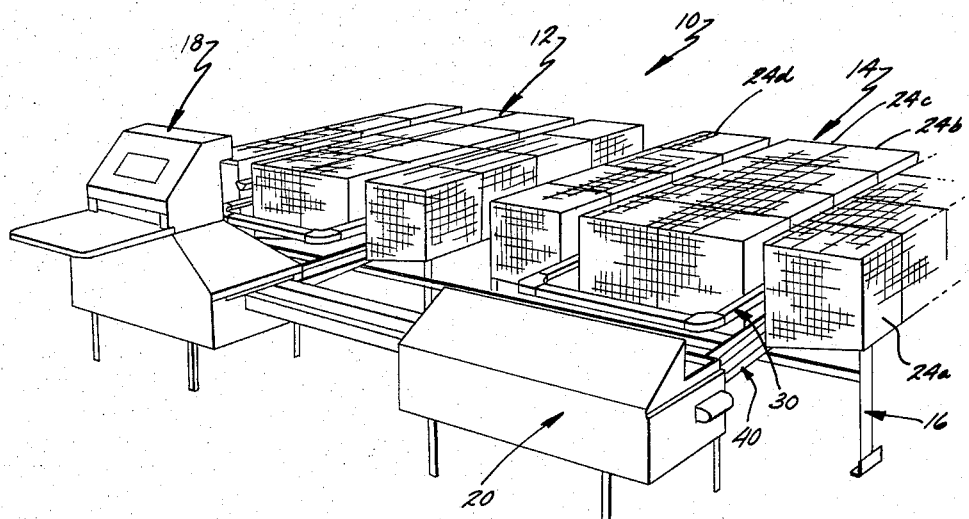
FIG. 1 is a perspective view of a typical poultry cage arrangement employing this invention.
Figure 2:
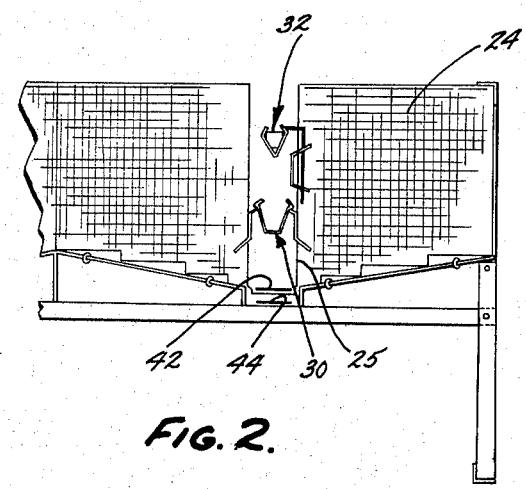
FIG. 2 is an enlarged, end elevational, fragmentary view of a portion of the apparatus illustrated in FIG. 1.

Each row of cages, for example of rows 24a, 24b, 24c, and 24d in group 14 in FIG. 1, is composed of a plurality of adjacent, interconnected individual cages 24′ (FIG. 4) to segregate the birds to a certain extent. Preferably, four cage rows are combined into one operative group, with the feed conveyor mechanism 30 passing between two rows in one pass, around the two center rows, and back through the other two rows. The watering system 32 is arranged in a similar manner. The feed trough is supported in a special manner set forth in detail in co-pending patent application entitled Poultry Cage Apparatus, filed August 27, 1964, Serial No. 392,537. The feeding system is supplied from a hopper using a feed chain or the equivalent.

It will be seen that the eggs from the rows in the two groupings 12 and 14, are automatically gathered together. This is only illustrative. Several different groups of cage rows may be embodied into one operative egg collection system as desired. The egg conveyor 40 passes between each two adjacent rows of cages, e.g. 24a and 24b. Each conveyor leg between two rows includes an egg receiving upper belt 42 and a lower return belt 44. The belts are driven by pulleys of the type shown in co-pending application entitled Egg Collection and Transveyor System, filed July 9, 1962, Serial No. 208,302 now Patent Number 3,166,175. The upper belt is positioned adjacent the lowermost edge of the slanted bottoms of the cage rows adjacent thereto.

Each elongated row of cages is basically rectangular in configuration, but has a bottom slanted toward the egg conveyor there adjacent. The four grouped rows are mounted on the individual frame assemblies 16 which likewise have slanted support portions cooperative with the cages.

More specifically, referring to FIG. 3, the framework 16 includes a plurality of four rectangularly spaced legs 50, each of which has a foot 52. These may be made of angle iron. Extending between the two oppositely positioned pairs of legs is a pair of beams 54, also usually made of angle iron. Hence, two legs and one attached beam form a stand spaced from the adjacent like stand. Supported on these beams 54, and extending transversely thereto, to be parallel to the rows of cages, is a plurality of support elements 56. These are arranged in pairs, and in the illustrated example include two pairs spaced from each other a distance equal to the thickness of two back-to-back cage rows. These elements 56 are elongated metallic plates which rest upon beams 54.

The two inner most elements, one of each pair, are interconnected by a plurality of support compression rods 60 which have a central peak portion 60′ and downwardly sloping side portions terminating in a pair of downwardly projecting end fingers. These end fingers interfit in receiving collars 62 secured to elements 56. These rods therefore space the two innermost elements. The two compression rods 60, positioned over beam 54, include downwardly extending legs 64 resting on the beams for support.

The assembly formed by the two innermost elements 56 and the connected compression rods are located on the beams by four locating protrusions 68 on the beams to contact the innerfaces of the two elements and prevent this assembly from shifting laterally on the beam.

The outside two elements 56, one of each pair, are located by attachment of diagonal rods 70 with the posts 50 on one end, and with elements 56 on the other end by being received in collars 62′ like those shown on the inside elements. These rods are at an upward slant outwardly away from support elements 56. Spaced along the elements 56, extending outwardly therefrom parallel to rods 70, and interconnected therewith by downwardly extending fingers, are cantilever support rods 74. Each of these includes an outwardly, upwardly slanted leg portion, and a vertically extending leg portion on the outer end of the slanted leg. These vertically extending legs of the several spaced, parallel like cantilever arms extend up the sides of the cages as illustrated at FIG. 4. The arm is preferably at the midpoint of each cage, so that each cage rests on one of the plurality of adjacent cantilever arms to be supported thereby. The arms cooperate to support the central section of the cage rows as well as the ends to hold the rows level and prevent the center from slumping downwardly. The cantilever arms are not deflected downwardly outwardly away from the cage by the weight of the cage due to the attachment of the upper end of each arm by a bracket 78 to the upper end of the cage, and because each arm includes an inwardly directed, horizontal terminal finger 75 that extends over the edge of the top of the outer cage rows. Any tendency for the central portion of the cage row to sag is prevented by abutment of this finger on the cage to prevent downward rod deflection, and by the retention clamp to prevent outward deflection. Even though these cantilever arms are merely of bar stock, and are somewhat flexible in nature, still they effect excellent support for the cage row due to their unique configuration and cooperation and attachment with the cage rows, and their positioning between and astraddle fixed bars 70. Thus the cage is prevented from bowing downwardly to distort the egg conveyor.

The egg conveyor is positioned between the guides 56 and is located in optimum relationship to the lower edge of the cages because the elements 56 not only support the cantilever bars and the compression rods, for the cages, but also exactly position the conveyor with respect to the cages for optimum relationship thereto. Each cage includes a roll out opening 25 adjacent the upper conveyor belt 42 so that eggs roll out of the cage onto the conveyor belt.

The entire supporting assembly, and the assembly combination with the rows of cages is a relatively simple construction which is lightweight and readily assembled. It can be manufactured relatively inexpensively and sold relatively inexpensively to poultry raisers. The assembly can be put together in a very short time at any place convenient, for example at poultry house. In spite of its simplicity and lightweight characteristics, it provides excellent structural support for the cages, allowing optimum relationship between the cages and the egg conveyors, as well as inexpensive support to keep the cage off the floor.

It is conceivable that certain minor details of the structure could be changed within the inventive concept set forth. Hence, the invention is not to be limited to the specific preferred structure illustrated, but only by the scope of the appended claims and the reasonably equivalent structures to those defined therein.

We claim:

1. A poultry cage assembly comprising: at least one row of poultry cages; floor engaging, upright, cage row supporting framework means, cantilever rods carried by said supporting framework means at spaced intervals along said row of cages to support them; said rods extending laterally at an upward slant beneath the bottoms of said cages and then upwardly alongside said cages to carry said cages; means securing the upper portions of said rods to said cages; the bottoms of said cages being slanted corresponding to said rods; said cages having egg roll out openings along the lowermost edges of the slanted bottom; and said framework means including egg conveyor guide means along the lowermost edge of the slanted bottom of said row of cages to receive eggs therefrom.

2. A poultry cage assembly comprising: a plurality of rows of poultry cages and support frame means thereunder; said frame means including beams transverse to the rows of cages; a plurality of elongated elements mounted on said beams, transverse thereto, and parallel to said cage rows; said elements being in spaced pairs between said cage rows, each pair being spaced to form egg conveyor boundaries; a plurality of cage support rods attached to said elements and extending transversely thereto, generally parallel to said beams; some of said rods supporting the outermost cages, and comprising cantilever rods having one end attached to said elements; said cantilever rods extending laterally beneath said outermost cages, and having portions extending upwardly alongside said cages and attached to said cages.

3. A poultry cage assembly comprising: a plurality of rows of poultry cages, and support frame means therefor; said frame means including beams transverse to the rows of cages; a plurality of elements mounted on said beams, transverse thereto, and parallel to said cage rows; said elements being in pairs between said cage rows, forming egg conveyor boundaries; a plurality of spaced, parallel cage support rods attached to said elements and extending transversely therefrom under respective rows of cages; the rod supporting the outermost cages comprising cantilever rods having one end attached to said elements; said cantilever rods extending laterally beneath said outermost cages at a slight upward slant and upwardly alongside said cages; the upper ends of said cantilever rods being attached to the outermost cage rows to prevent deflection of said cantilever rods; the rods under the central cage rows comprising compression elements having a center peak to support the central cage rows at a slant toward said conveyor boundary elements, and the bottoms of said cage rows being slanted like said rods.

4. A poultry cage support comprising: a plurality of parallel beams supported on legs; a plurality of sets of egg conveyor guides transverse to and carried by said beams; said sets being spaced from each other the width of two poultry cages; each set of guides including a pair of adjacent elongated elements spaced the width of an egg conveyor; cage supporting compression rods extending between adjacent sets and having their opposite ends attached to said element; said rods being peaked in the center thereof to support two cage rows back-to-back; and a plurality of cantilever rods extending laterally from both sides of said support, from the outermost elements of said sets, at an upward slope.

5. A poultry cage assembly comprising: a plurality of rows of poultry cages, and supprots frame means therefor; said frame means including beams transverse to the rows of cages; a plurality of tie elements mounted on said beams, transverse thereto, and parallel to said cage rows to tie said frame means to also form egg conveyor guide means; a plurality of spaced, parallel cage support rods attached to said elements and extending transversely therefrom under respective rows of cages; the rods supporting the outermost cages extending laterally beneath said outermost cages at a slight upward slant and being attached to said outermost cage rows; the rods under the central cage rows having a center peak to support the central cage rows at a slant toward said elements forming said conveyor guide means; the bottoms of said cage rows being slanted like said rods, for rolling eggs therefrom to said conveyor guide means; and egg roll out openings from said cages adjacent said guide means to enable egg transfer therefrom to a conveyor.

6. A poultry cage assembly comprising: a plurality of rows of poultry cages and support frame means thereunder; said frame means including beams transverse to the rows of cages; a plurality of elongated elements mounted on said beams, transverse thereto, and parallel to said cage rows; a plurality of cage support rods attached to said elements and extending transversely thereto, generally parallel to said beams; some of said rods supporting the outermost cages, and comprising cantilever rods having one end attached to said elements; said cantilever rods extending laterally beneath said outermost cages, and having portions extending upwardly alongside said cages and attached to said cages.

7. A poultry cage assembly comprising: a plurality of rows of poultry cages, and support frame means therefor; said frame means including beams transverse to the rows of cages; a plurality of elements mounted on said beams, transverse thereto, and parallel to said cage rows; a plurality of spaced, parallel cage support rods attached to said elements and extending transversely therefrom under respective rows of cages; the rods supporting the outermost cages comprising cantilever rods having one end attached to said elements; said cantilever rods extending laterally beneath said outermost cages at a slight upward slant and upwardly alongside said cages; the upper ends of said cantilever rods being attached to the outermost cage rows to prevent deflection of said contilever rods; the rods under the central cage rows comprising compression elements having a center peak to support the central cage rows at a slant toward said conveyor boundary elements, and the bottom of said cage rows slanted like said rods.

8. A poultry cage support comprising: a plurality of parallel beams supported on legs; a plurality of elements transverse to and carried by said beams; cage supporting compression rods extending between adjacent elements and having their opposite ends attached to said elements; said rods being peaked in the center thereof to support two cage rows back-to-back; and a plurality of cage supporting cantilever rods extending laterally from both sides of said support, from the outermost elements at an upward slope.

References Cited by the Examiner

UNITED STATES PATENTS

| | | | |
|---|---|---|---|
| 860,511 | 7/1907 | Airhart | 119—45 |
| 2,756,721 | 7/1956 | Hayes | 119—48 |

SAMUEL KOREN, *Primary Examiner.*

HUGH R. CHAMBLEE, *Examiner.*